Jan. 1, 1952     J. A. KENNEDY     2,580,434
VEHICLE TRACTION DEVICE
Filed April 26, 1948
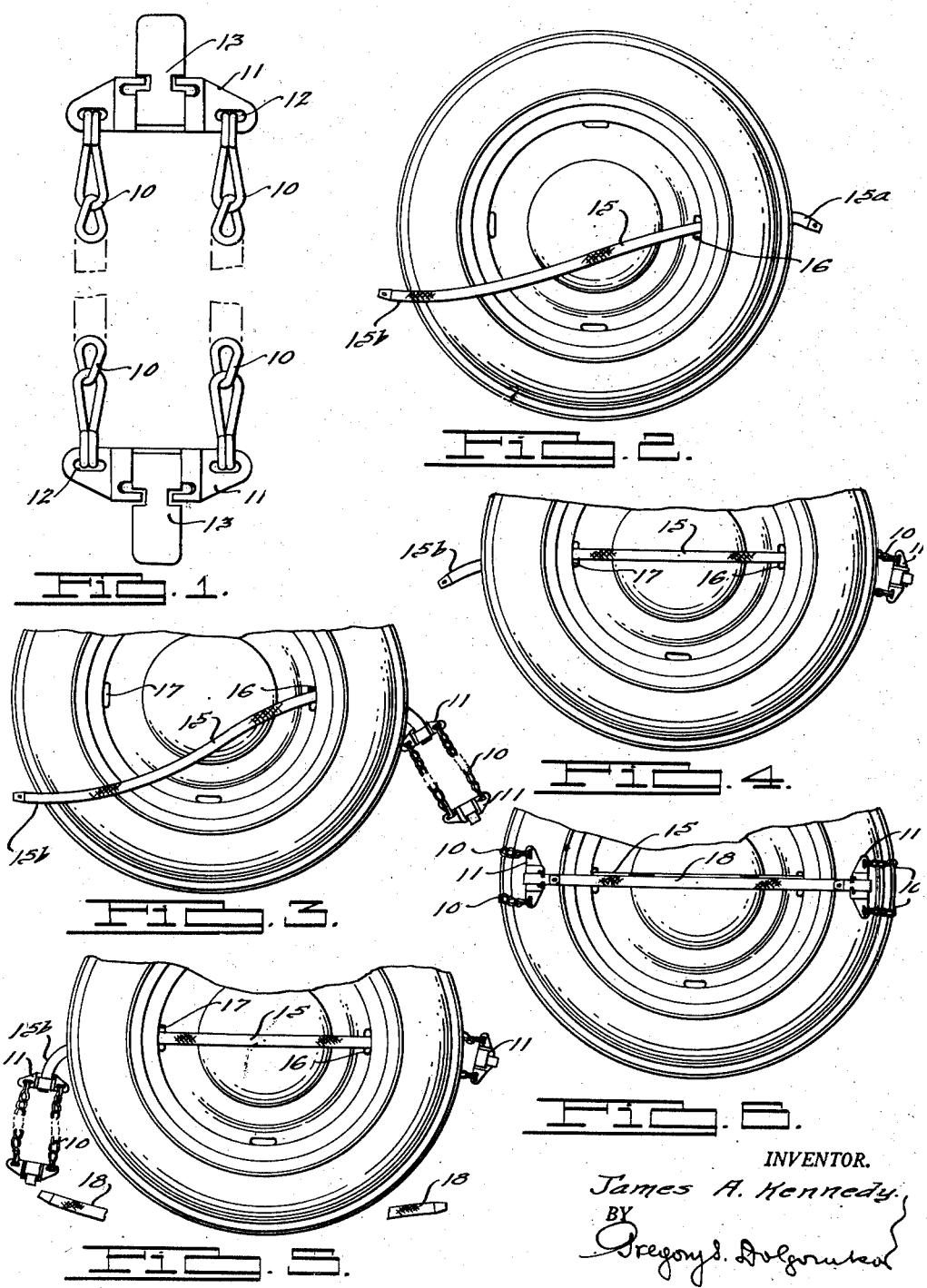
INVENTOR.
James A. Kennedy,
BY
Gregory J. Dolgorukov
ATTORNEY.

Patented Jan. 1, 1952

2,580,434

UNITED STATES PATENT OFFICE 2,580,434

VEHICLE TRACTION DEVICE

James A. Kennedy, Ann Arbor Township,
Washtenaw County, Mich.

Application April 26, 1948, Serial No. 23,330

3 Claims. (Cl. 152—233)

This invention relates to traction devices for motor vehicles, and more particularly to a device adapted to be connected to a driving wheel of a motor vehicle to increase the traction of the rubber tire thereof with the ground.

It is well understood in the art that because of the provision of a differential device in the driving axle of a motor vehicle, should one of the driving wheels thereof lose traction with the ground by getting on ice, deep snow or in a mud hole, it begins to spin, while the other driving wheels remain stationary, thus stalling the vehicle. One of the effective means for avoiding such stalling is the use of chains on the driving wheels of the vehicle. Numerous types of such chains have been devised and are available at moderate prices. The chains of each respective type have solved in various degrees the problem of improving tire traction, but the problem of easy application of the chains to the wheels still remains only partially solved.

With insignificant exceptions, the present day motor vehicles are provided almost exclusively with the disc type wheels having a number of slots which for the sake of appearance of the wheel are usually made so narrow as to be barely sufficient for the passage of the chain attaching strap. Moreover made by stamping, such slots have the metal of the wheel adjacent them tapering inwardly of the wheel, thus producing on the opposite side of the sheet from which the disc of the wheel is made a raised bead around the slot. Such a construction of vehicle wheels is now almost universal and it makes attaching tire chains a very difficult and annoying operation. With the tire chains now extensively used it is necessary to insert the end of the chain attaching strap into the wheel slot from the inner side of the wheel. In view of the above explanation of the construction of the wheel at the slot, it can be easily appreciated that unless the end of the attaching strap is placed exactly opposite the slot, it cannot go through it and if pushed in, will be guided away by the bead. Finding the small slot from the inner side of the wheel is very difficult even under the most favorable conditions. In darkness, particularly in cold weather, or when the vehicle is stalled in deep mud, this particular part of the operation of applying tire chains may be a most trying experience for a person not used to work with wheels and tires.

One of the objects of the present invention is to provide an improved tire traction device in which the above difficulties are overcome and largely eliminated, and which can be applied to a wheel in a simple and easy manner.

Another object of the invention is to provide an improved traction device for motor vehicles which can be attached to the wheel with the aid of means such as straps, cord, chain or the like, without the necessity of passing such strap and the like through the wheel slot from the inner side of the wheel.

A further object of the invention is to provide an improved traction device for motor vehicles which when attached in a normal way does not destroy or affect appreciably the dynamic balance of the wheel and has a tendency of self-tightening, and therefore is less objectionable on the wheel of a vehicle which may be driven for an appreciable distance along a highway, and is less noisy in city traffic.

A still further object of the invention is to provide an improved tire traction device of the foregoing character, which is simple in construction, safe and dependable in operation, and is relatively inexpensive to manufacture.

Other objects of this invention will appear in the following description and appended claims, reference being had to the accompanying drawings forming a part of this specification, wherein like reference characters designate corresponding parts in the several views.

Fig. 1 is a view showing one traction device embodying the present invention.

Figs. 2–6 illustrate application of two of my improved traction devices to a vehicle wheel with the aid of two attaching straps at two diametrically opposite wheel slots.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawing there is shown by way of example an improved traction device for motor vehicles, embodying the present invention. Referring to Fig. 1, the device or traction assembly illustrated therein comprises a plurality of chain pieces 10, 10 secured by their ends in any suitable manner to two headers or spreaders 11, 11, as indicated at 12. It is preferable to use two chain pieces and to select their length in such a manner as to ensure that when the device is applied to a wheel, the chain pieces overlie the tread of the tire transversely thereof, and the headers 11 are brought into position on the sides of the tire near the wheel rim, see Fig. 6. The chain pieces 10, 10 are preferably arranged parallel to each other.

Each of the headers 11 carries a strap locking buckle 13 of any suitable type adapted to receive and to hold therein the respective end of an attaching strap and ensuring easy disconnecting of the strap from the header. A number of types of such buckles satisfactory for such a purpose is now available, and since the buckle as such does not form the present invention, no further description thereof is deemed necessary.

The attaching strap is preferably a flat piece of any suitable material; straps approximately one inch in width and one eighth of an inch in thickness are very satisfactory in view of the elongated shape of the wheel slots. In contemplation of a possibility that for the purposes of simplifying manufacture, round holes may be used instead of narrow slots requiring more expensive dies, it will be understood that attaching members of round cross section, such as pieces of strong cord, thin ropes and the like may be employed with corresponding change in the type of the locking buckle. The buckles may also be selected to adapt the device to be attached with a piece of chain.

With the construction as described, my improved traction device of a single size is suitable for practically all tire sizes of passenger motor vehicles, and therefore it may be supplied to market as a single unit, with service stations and stores supplying the attaching straps by cutting on demand the straps of length required for a given size of tires, from a roll of web strap or a similar material. Thus the necessity of anticipating the demand for each particular size of attaching strap is eliminated, and the possibility of running out of certain sizes thereof while having excess of other sizes, is substantially reduced for a distributing source. The above provides a distinct advantage, and by decreasing the cost of distribution, decreases the cost of my improved traction device to the user.

Moreover, the purchaser may in many cases desire to provide his own attaching strap, and the construction of my improved traction device is fully adapted for such a condition. It may also be desired to replace a broken or worn out strap without buying a new traction device, or without taking a trip to the source of the supply of the traction devices merely to purchase an attaching strap. With my traction device, this may be done very easily, which is not only a convenience for the user, but in a case of emergency is an advantage of critical importance.

My improved traction device may be attached to a wheel either individually at any one of the wheel slots with the aid of a single strap, or two of such devices may be attached at two different but diametrically opposite slots of a wheel, in which case two attaching strips are required. Each of the above methods of attaching my traction device has its distinct adlvantages, and either of them may be employed depending on conditions and personal preference.

Figs. 2-6 illustrate in detail attaching two of my traction devices with the aid of two straps. With such a method, the end 15a of one of the straps, which strap is designated by the numeral 15 is first passed from the outer side of the wheel through the wheel slot 16, see Fig. 2. Thereupon one traction device is connected to said end, see Fig. 3. Because of the length of the strap 15 this operation may be done with convenience at the outer side of the wheel. The end 15b of the strap 15 is next passed, also from the outer side of the wheel, through the slot 17, see Fig. 4. The second traction device is then connected to the end 15b as illustrated in Fig. 5. This operation can also be performed at the outer side of the wheel and with convenience, since the strap 15 may be pulled out as far as it will go without the danger of its opposite end coming out of its slot, such danger being eliminated by the presence of a traction device acting as a stop. Thereupon both traction devices are connected together across the hub of the wheel with the second strap 18. The traction devices are then arranged evenly on the wheel and the strap 19 tightened.

When connected as described above, the traction devices have a tendency to tighten themselves on a rotating wheel because of the operation of centrifugal force when the vehicle has to be driven at a relatively high speed along a highway. Also they are less noisy in city traffic.

For attaching my traction device individually, it is first attached with one of its buckles to the very end of its strap, and the free end of the strap is passed from the outer side of the wheel through the respective wheel slot. The end of the strap is then reached and brought over to the front or the outer side of the wheel where it is attached to the other locking buckle of the device. The device is then arranged evenly on the tire and the straps tightened at the first buckle.

It will now be seen in view of the foregoing that all attaching operations on my improved device are performed at the outer side of the wheel, in full view and with convenience.

By virtue of the construction of my improved traction device described above, the objects of the invention listed above and numerous additional advantages are attained.

I claim:

1. A traction assembly for motor vehicles having wheels with tires, said assembly comprising two headers, two pieces of chain of equal length arranged parallel to each other and adapted when the assembly is applied to a wheel to overlie the tire transversely thereof; a locking buckle on each of said headers, each of said buckles adapted to receive one of the two identical ends of an attaching strap.

2. A traction device for motor vehicles having wheels with tires, said device comprising two traction assemblies, each of said assemblies including a pair of spaced headers and two chains connecting said headers and adapted to overlie the tire transversely to bring the headers to both sides of the tire, a buckle provided on each of said headers for detachably connecting to each of said assemblies one of the two ends of each of two flexible attaching members, and two attaching members made of flexible nonmetallic material, each of said members having two ends and the length sufficient to extend in connected condition diametrically of the wheel from one assembly to the other.

3. A device as defined by the preceding claim, the connecting members being made of webbing material.

JAMES A. KENNEDY.

REFERENCES CITED

The following references are of record in the file of this patent:

UNITED STATES PATENTS

| Number | Name | Date |
| --- | --- | --- |
| 2,239,730 | Moore | Apr. 29, 1941 |
| 2,252,759 | Dodson | Aug. 19, 1941 |